3,062,615
PROCESS FOR THE PRODUCTION OF TITANIUM TETRAIODIDE

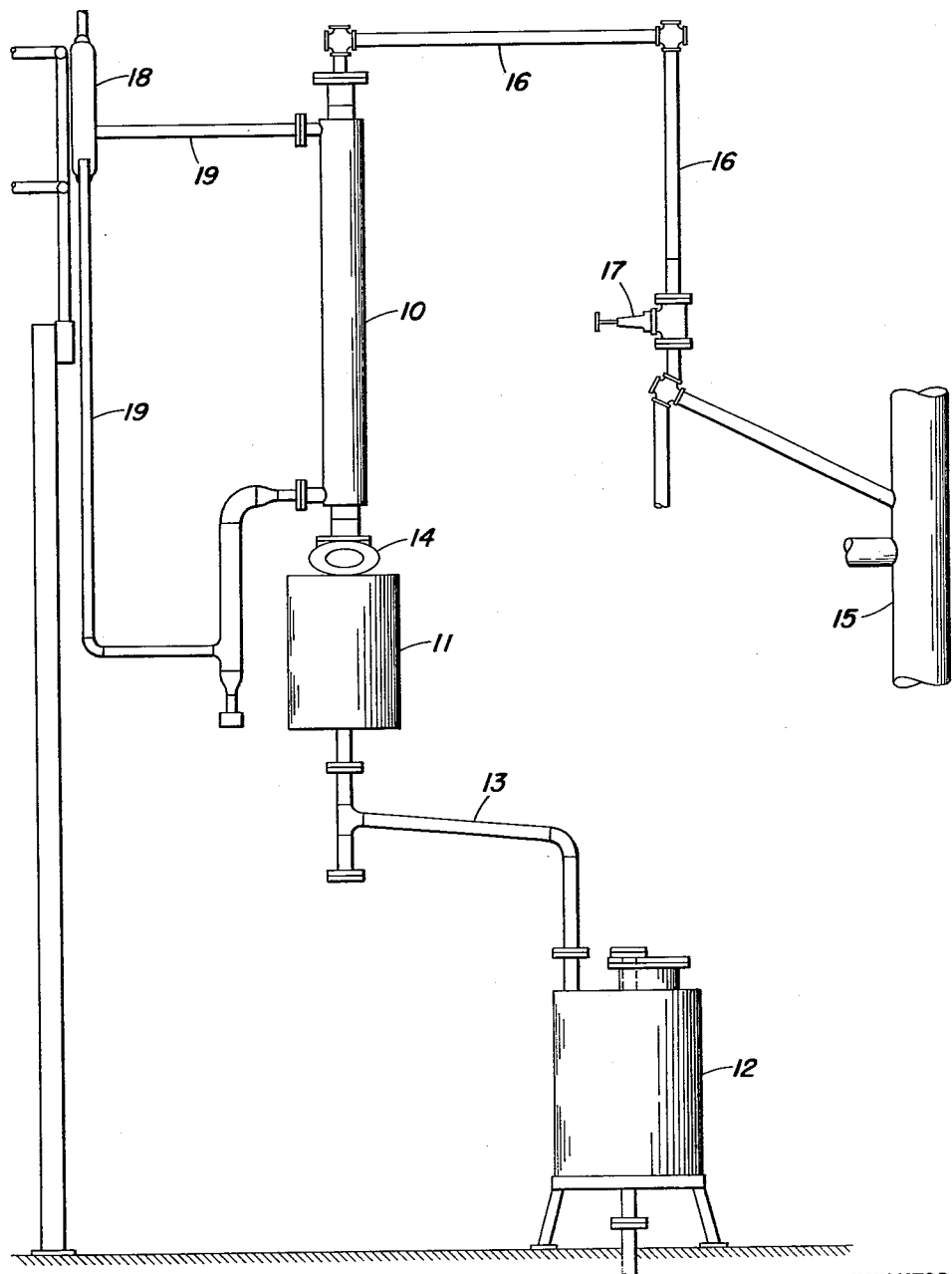
INVENTORS
Ivor E. Campbell
George H. Kesler

Ivor E. Campbell, New Albany, and George H. Kesler, Worthington, Ohio, assignors, by mesne assignments, to Chilean Nitrate Sales Corporation, New York, N.Y., a corporation of New York
Filed May 26, 1959, Ser. No. 816,003
9 Claims. (Cl. 23—87)

This invention relates in general to metallurgy, and has for its object the provision of a novel process for the production of titanium tetraiodide. More particularly, the invention contemplates the provision of a unique technique for producing titanium tetraiodide from scrap titanium metal and iodine in which virtually complete conversion of the iodine is realized.

Scrap titanium metal which is now available in relatively abundant quantities, provides a convenient and comparatively inexpensive source of titanium for use in the production of titanium tetraiodide. Titanium tetraiodide, on the other hand, is a valuable starting material for use in the production of ultra pure titanium metal, and also finds utility as a catalyst in the polymerization of cis-butadiene to an elastomer structure for blending with natural rubber. While the reaction of titanium metal with iodine for the production of $TiI_4$ is known, per se, considerable difficulty has been experienced heretofore in controlling the reaction owing to its strongly exothermic nature, and the fact that the metal can react explosively with liquid iodine. The tetraiodide may be produced also by passing iodine in vapor form over titanium metal, but this process is relatively inefficient and the capacity per unit volume for the reaction mechanism is quite low.

The present invention is based, in part, on our discovery that simplicity of control, safety of operation and virtually complete conversion of iodine can be obtained in the otherwise potentially dangerous reaction $$Ti + 2I_2 \rightarrow TiI_4 \text{ (180,600 B.t.u./lb. mole reacted at 25° C.)}$$

by a special arrangement of the requisite reaction vessels to produce constant gravity refluxing, whereby control of the violently exothermic reaction mass is maintained through the continuous removal of heat therefrom by means of a liquid titanium tetraiodide reflux established over the titanium metal charge.

It is believed that our invention may be best understood by reference to the following detailed description of the same taken in conjunction with the accompanying drawing wherein the single FIGURE illustrates, in schematic form, a typical arrangement of the essential units utilized in the practice of our process.

With reference to the drawing, it will be seen that the reactor system consists essentially of three principal units arranged physically one above the other. The order of arrangement from top to bottom is a liquid reflux condenser 10, a scrap reactor vessel 11, and a reboiler unit 12.

Titanium metal, preferably in the form of scrap, is charged into reactor vessel 11, whereas the iodine reactant is initially introduced into the system at reboiler unit 12. The latter unit serves as a vaporizer or boiler, and in operation causes the iodine to be vaporized and passed in gaseous form through connecting pipe 13 into reactor 11. The reactor vessel 11 is provided with both heating and cooling units (not shown).

In initiating operation of the system, reboiler 12 is heated to the extent required to vaporize iodine into reactor 11, whereas the reactor is pre-heated to approximately 400° F. As the vaporized iodine contacts the heated titanium in reactor 11, reaction occurs with the formation of titanium tetraiodide. The titanium tetraiodide gas thus produced passes through connecting pipe 14 into condenser 10 along with any unreacted gaseous iodine, wherein they are cooled and condensed. After condensing, the condensate of liquid titanium tetraiodide and any entrained condensed and/or dissolved iodine flows under action of gravity into the reactor 11. Some of the condensate vaporizes within the reactor 11, passes through the connecting pipe 14 into the condenser 10 along with additional quantities of freshly produced titanium tetraiodide vapors and unreacted iodine gas, condenses, and again flows back into the reactor 11. The balance of this condensate passes from the reactor 11 via piping 13 into the reboiler 12 wherein it is accumulated throughout the cycle of operations.

In draining back through reactor 11, the condensate is brought into intimate contact with the reacting bed of titanium metal contained therein and serves as a constant self-contained coolant for the hot scrap metal. Thus, cooling of the reacting bed of titanium metal is believed to be accomplished primarily by revaporization of the condensate which is returned to the reactor, these vapors thus carrying heat away from the titanium metal in an amount equivalent to their latent heat of vaporization. In this manner, the highly exothermic nature of the reaction, resulting in release of approximately 3770 B.t.u. per pound of titanium converted, is prevented from heating the scrap metal charge to the excessively high and unsafe temperatures which would otherwise result during continuation of the reaction. In addition to the reflux cooling of the metal charge, provision is made for cooling the reactor walls by means of a simple air blast or any other equivalent conventional cooling technique. In this manner, the reactor 11 can be readily maintained at temperatures below 1000° F.

It is postulated that the reaction of titanium metal and iodine in our process probably is not entirely between iodine vapors and the metal, although the initial reaction certainly is triggered by the iodine vapor. Thus, the condensate returning to the reactor vessel in the manner explained above, probably contains condensed iodine, and subsequent reaction of the titanium metal may occur with this condensed iodine. In addition, it is quite likely that the titanium metal has a film of titanium iodide upon its surfaces, and that iodine vapors dissolve in this film and react in a liquid-solid mechanism with the titanium metal.

As will be readily appreciated, if titanium metal from the reactor vessel was free to pass directly into the reboiler 12, a violent, uncontrolled and possibly destructive reaction could occur. In order to prevent such an occurrence in the apparatus illustrated in the drawing, an auxiliary safety feature is provided by connecting the offset pipe 13 into a central segment of a vertical pipe extending downward from the reactor 11. In this manner, any titanium metal which might fall downward out of the reactor chamber will not enter pipe 13 and, subsequently, the reboiler 12, but rather, the metal will fall and collect in the lower extremity of the vertical pipe or trap extending downward from the bottom of the reactor. Of course, auxiliary or additional preventative measures such as baffling the vapor port into the reactor vessel, suitably supporting the metal charge within the reactor, or prefabricating the metal mass in such configuration as to be self-supporting, could be adopted in order to maintain the reboiler free of titanium metal.

The system illustrated in the drawing further comprises a distillation column 15, shown in fragmentary form, which is used to purify the accumulated titanium tetraiodide by removing any traces of iodine not converted during normal operations. In actual practice, it may occur that the products of the scrap reaction will contain trace amounts of solid contaminants, probably oxides, held in suspension. Unless removed, these solids will be carried over with the liquid iodine-titanium tetraiodide mixtures into the distillation column. Under these circumstances, the solid contaminators can be removed by installing an intermediate vaporizer (not shown) between the scrap-reactor system and the distillation column 15. The scrap-reactor products may then be supplied to the distillation column 15 in vapor form, and the solids simply accumulated in the intermediate vaporizer.

In the system illustrated in the drawing, we find it to be most convenient to vent condenser 10 through the distillation column 15 as represented by piping 16 and valve 17. Alternatively, an additional condenser can be used in place of this venting arrangement. In addition, a secondary condenser 18 is interconnected to condenser 10 by means of piping 19 to condense the heat-transfer fluid used in the jacket of the primary condenser.

It is believed that the following specific example will further illustrate the foregoing principles and procedures as applied to the actual production of $TiI_4$ within the apparatus of the invention:

*Example*

Approximately 104 pounds of scrap titanium metal in the form of sheet or filament scrap was charged to reactor vessel 11. The reboiler 12 was filled with 1290 pounds of liquid iodine. The reactor was warmed to about 400° F., and the reboiler heated to about the boiling point of iodine (363° F.). Anisole (B.P. 155° C.) was conveniently selected as the heat-transfer fluid used in the jacket of the primary condenser owing to the fact that its boiling point is only 1° or less below the melting point of $TiI_4$ (156° C.), such that a temperature difference of only 1° C. from the condensing vapors to the boiling anisole served to prevent condensation of $TiI_4$ as a solid, while at the same time, functioning to maintain the condensation surface as close to the melting point as possible. Furthermore, by providing a boiling liquid as the cooling agent, much better heat-transfer rates are obtained than by using a circulating liquid medium.

It was found that approximately one (1) hour was usually required to bring vessels 11 and 12 to operating temperatures. In most cases, an excess of titanium is used to facilitate the reaction, with the residual metal being utilized within a succeeding cycle of operations.

During the production portion of the cycle, the temperature of reboiler 12 increased from the boiling point of iodine to the boiling point of approximately a 90 percent $TiI_4$—10 percent iodine mixture (505° F.). The progressive increase and eventual leveling off of this temperature provided an indication of the completion of the reaction.

At the end of 13 hours running time, on the average, it was found that 98 pounds of titanium had been converted and 1140 pounds of $TiI_4$ was recovered, representing a titanium conversion rate of about 7.5 pounds per hour.

Having thus described the subject matter of our invention, what it is described to secure by Letters Patent is:

1. In a process for the production of titanium tetraiodide by the exothermic reaction of titanium metal with iodine, the improvement that comprises maintaining the metallic reaction mass at safe operating temperatures by continuously cooling and condensing the titanium tetraiodide produced, and refluxing the resulting liquid which consists essentially of titanium tetraiodide in liquid form into intimate contact with said metallic titanium to remove exothermic heat of the reaction, and thereafter collecting the refluxed stream of liquid titanium tetraiodide.

2. In a process for the production of titanium tetraiodide by the exothermic reaction of scrap titanium metal with iodine, the improvement that comprises maintaining the metallic reaction mass at safe operating temperatures by continuously cooling and condensing the titanium tetraiodide produced, and establishing a gravity reflux of the resulting liquid which consists essentially of titanium tetraiodide and a minor portion of unreacted iodine in liquid form into intimate contact with said metallic titanium to remove exothermic heat of the reaction, and thereafter collecting the refluxed stream of liquid titanium tetraiodide.

3. Process for the production of titanium tetraiodide that comprises, contacting heated metallic titanium with gaseous iodine to produce titanium tetraiodide in the gas phase, cooling and condensing said gaseous titanium tetraiodide to produce liquid titanium tetraiodide, refluxing the resulting liquid which consists essentially of titanium tetraiodide in liquid form into contact with said metallic titanium to remove excessive exothermic heat liberated during reaction of said titanium with said gaseous iodine, and thereafter collecting said refluxed stream of liquid titanium tetraiodide.

4. Process for the production of titanium tetraiodide that comprises, contacting heated metallic titanium with gaseous iodine to produce titanium tetraiodide in the gas phase, cooling and condensing said gaseous titanium tetraiodide to produce liquid titanium tetraiodide, refluxing the resulting liquid which consists essentially of titanium tetraiodide and a minor portion of unreacted iodine into contact with said metallic titanium to remove excessive exothermic heat liberated during reaction of said titanium with said gaseous iodine, said reflux resulting in revaporization of a portion of the refluxed condensate, and collecting the remainder of said refluxed condensate.

5. The process as claimed in claim 4, wherein at least a portion of said refluxed, condensed iodine reacts with said titanium metal for the production of additional quantities of titanium tetraiodide.

6. Process for the production of titanium tetraiodide that comprises, contacting heated titanium scrap metal with gaseous iodine to produce titanium tetraiodide in the gas phase, cooling and condensing said gaseous titanium tetraiodide to produce liquid titanium tetraiodide, refluxing the resulting liquid which consists essentially of titanium tetraiodide and a minor proportion of unreacted iodine into contact with said scrap titanium metal to remove excessive exothermic heat liberated during reaction of said metal with said gaseous iodine, and thereafter collecting said refluxed stream of liquid titanium tetraiodide.

7. Process for the production of titanium tetraiodide that comprises, continuously contacting heated titanium scrap metal with gaseous iodine to produce titanium tetraiodide in the gas phase, cooling and condensing said gaseous titanium tetraiodide at a point above the reacting titanium scrap metal and iodine to convert the gaseous tetraiodide into liquid titanium tetraiodide, permitting the resulting liquid which consists essentially of titanium tetraiodide and a minor portion of unreacted iodine to flow back into intimate contact with said titanium scrap metal to remove excessive exothermic heat liberated during reaction of said metal with said gaseous iodine, and thereafter collecting said refluxed liquid titanium tetraiodide at a point below the reacting titanium scrap metal and iodine.

8. The process as claimed in claim 7, which further comprises the step of distilling said titanium tetraiodide-iodine mixture to effect the separation and recovery of substantially pure titanium tetraiodide therefrom.

9. The process as claimed in claim 7, wherein said refluxed liquid titanium tetraiodide also contains solid contaminants derived from said scrap titanium metal, and further comprising the steps of re-vaporizing the titanium tetraiodide and iodine to separate the same from said solid contaminants, and distilling the resulting titanium tetraiodide-iodine mixture to effect the separation and recovery of substantially pure titanium tetraiodide therefrom.

(References on following page)

References Cited in the file of this patent

UNITED STATES PATENTS

| | | |
|---|---|---|
| 1,466,435 | Hammond | Aug. 28, 1923 |
| 2,550,447 | Blumenthal | Apr. 24, 1951 |
| 2,616,784 | Reimert | Nov. 4, 1952 |
| 2,680,670 | Smith | June 8, 1954 |
| 2,725,284 | Polissar | Nov. 29, 1955 |
| 2,816,064 | Smith | Dec. 10, 1957 |
| 2,868,622 | Bennett et al. | Jan. 13, 1959 |
| 2,916,351 | Hansley et al. | Dec. 8, 1959 |

OTHER REFERENCES

Barksdale: "Titanium," pages 85–86 (Ronald Press Co., New York, 1949).